March 14, 1961

E. D. CLICKNER 2,974,570

METHOD OF MAKING GEARING

Original Filed Nov. 27, 1957

INVENTOR.
EARLE D. CLICKNER
BY
Kenyon & Kenyon
ATTORNEYS

March 14, 1961  E. D. CLICKNER  2,974,570
METHOD OF MAKING GEARING
Original Filed Nov. 27, 1957  3 Sheets-Sheet 2

INVENTOR.
EARLE D. CLICKNER
BY
Kenyon & Kenyon
ATTORNEYS

March 14, 1961 E. D. CLICKNER 2,974,570
METHOD OF MAKING GEARING
Original Filed Nov. 27, 1957 3 Sheets-Sheet 3
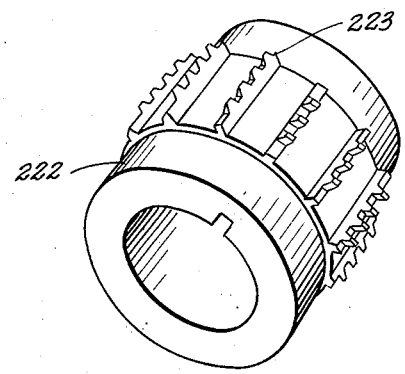
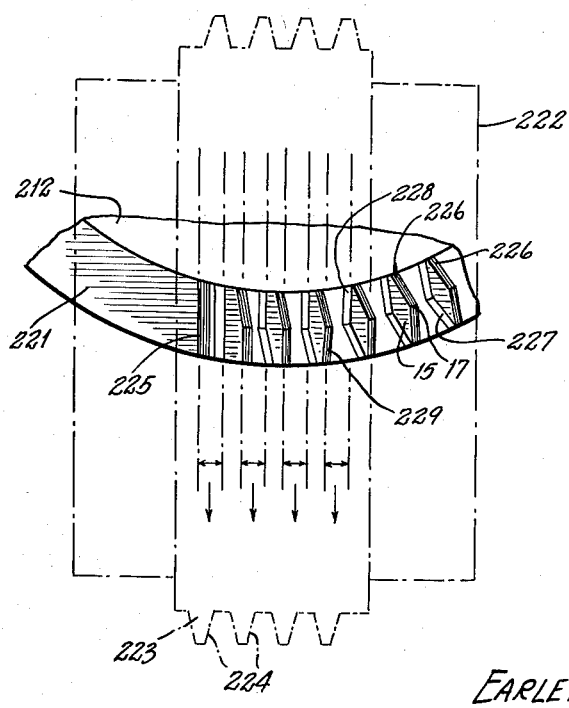
INVENTOR.
EARLE D. CLICKNER
BY
Kenyon & Kenyon
ATTORNEYS

United States Patent Office 2,974,570
Patented Mar. 14, 1961

2,974,570

METHOD OF MAKING GEARING

Earle D. Clickner, Kalamazoo, Mich., assignor to Shakespeare Company, Kalamazoo, Mich., a corporation of Michigan Original application Nov. 27, 1957, Ser. No. 699,241. Divided and this application Apr. 8, 1959, Ser. No. 804,929

6 Claims. (Cl. 90—9)

This invention relates to a method of producing gears which are particularly adapted for use in fishing reels or similar devices where light weight, inexpensive right angle drives are employed and particularly in fishing reels of the fixed spool or spinning type.

This application is a divison of applicant's application Serial No. 699,241, filed November 27, 1957, for Fishing Reel and Gearing.

In such fishing reels there is provided a fixed spool and the line is taken off over the end of the spool and is rewound on the spool with a spooling member which is disposed coaxially with the fixed spool and which moves about the spool laying the line thereon. As the line is retrieved in such spools, many times reciprocation of the spooling member is brought about in order to level wind the line. Heretofore, the drive on such reels has usually been accomplished with bevel gears which are relatively expensive to make and which must be mounted and centered with considerable accuracy in order to assure smooth, even, running and in cases where level wind has been desired, separate means have been required to cause reciprocation of the spooling member axially of the spool.

One of the objects of the present invention is to provide a new method of producing new, inexpensive and easily made gears which can be effectively mounted and positioned with less care than would be required with bevel gears.

Another object is to provide a method of producing new gearing for a reel having a level wind mechanism in which the right angle gearing is such that there may be reciprocation between the gears during the drive.

Another object of the invention is to provide a method of making gears for right angle gear drive consisting of a common spur gear or pinion combined with a novel crown gear having teeth of novel configuration which can be easily produced at low cost and in which there may be a reciprocation between the gears during rotation.

Another object of the invention is to provide a novel method of producing a novel crown gear.

Other objects and advantages of the invention will appear from the following specification in which for the purpose of illustrating the invention there is shown a preferred form of the invention which gives desirable and satisfactory results but which it will be understood is merely illustrative of the invention which can be modified from the preferred form shown in order to attain the ends of the invention.

In the drawings:

Fig. 4 is a detailed view showing the intermeshing of the pinion and crown gear;

Fig. 5 is a view in section showing a top plan view of the intermeshing of the pinion and crown gear;

Fig. 6 is a view of a milling hob utilized in cutting the crown and gear; and

Fig. 7 is a top plan view illustrating the manner in which the teeth are cut in the crown gear.

The invention consists generally in producing a crown gear having peripheral teeth of generally diamond shape as viewed in plan with the lateral vertices of the teeth lying in a common circle concentric with the axis of the gear by cutting the teeth from a gear blank having a raised ring of generally rectangular cross section projecting laterally from a side face and extending concentrically of the axis of the gear blank. A groove is cut in the blank in the raised ring of the blank parallel to a radius thereof but spaced to one side thereof, thus forming one side of the diamond on one tooth by lying inside said circle and another side of a diamond on an adjacent tooth lying outside said circle. The interdental space is formed by cutting an identical groove radially and the gear is completed by cutting an identical groove in the blank on the opposite side of the radius and spaced therefrom, thus forming two additional sides of the diamond form of adjacent teeth, one side lying inside and the other outside said circle.

This is achieved by rotating the gear blank on its axis simultaneously with the cutting of the grooves.

Figure 1:
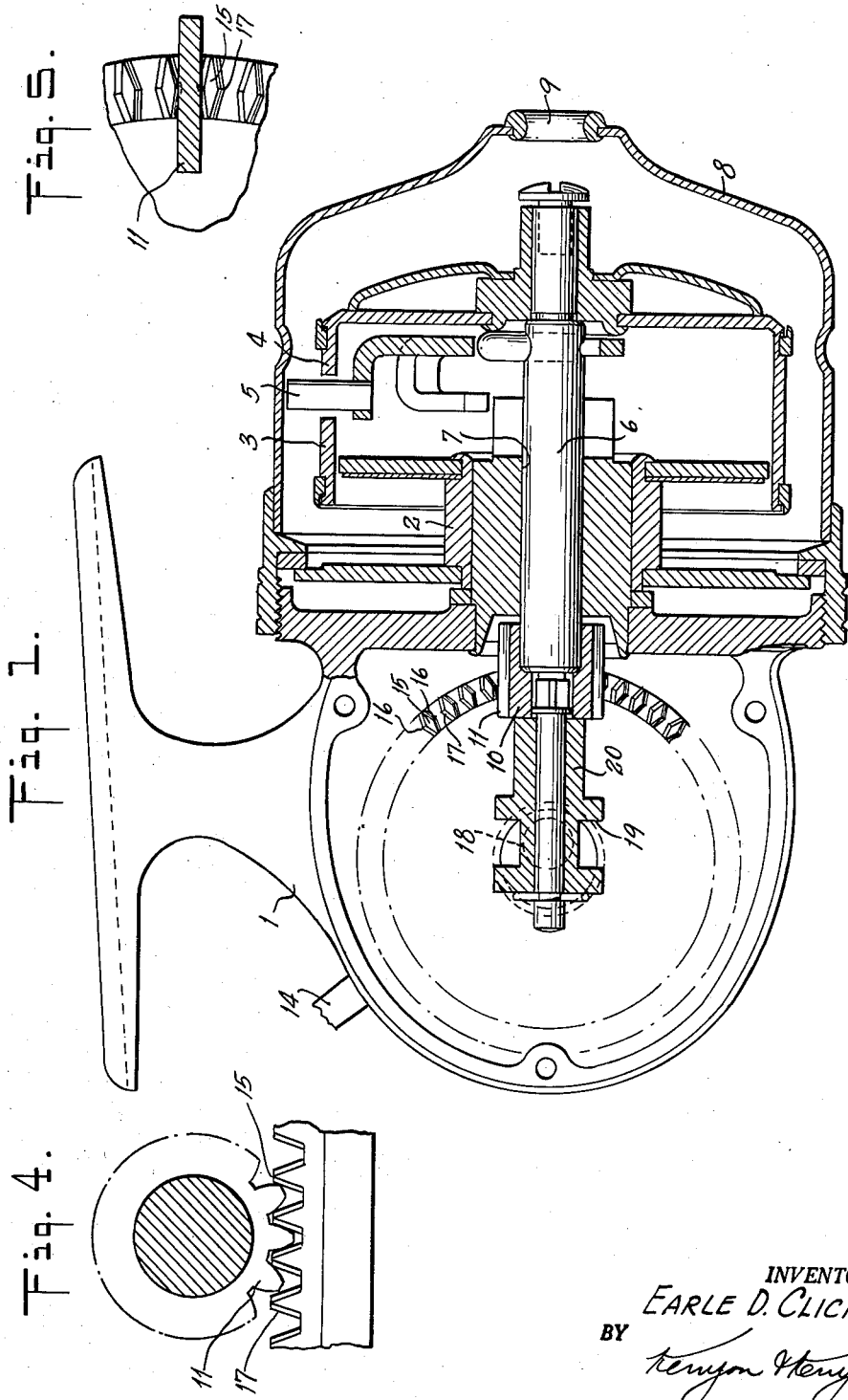
Fig. 1 is a sectional view through a reel embodying novel gearing made in accordance with my invention.
Figure 2:
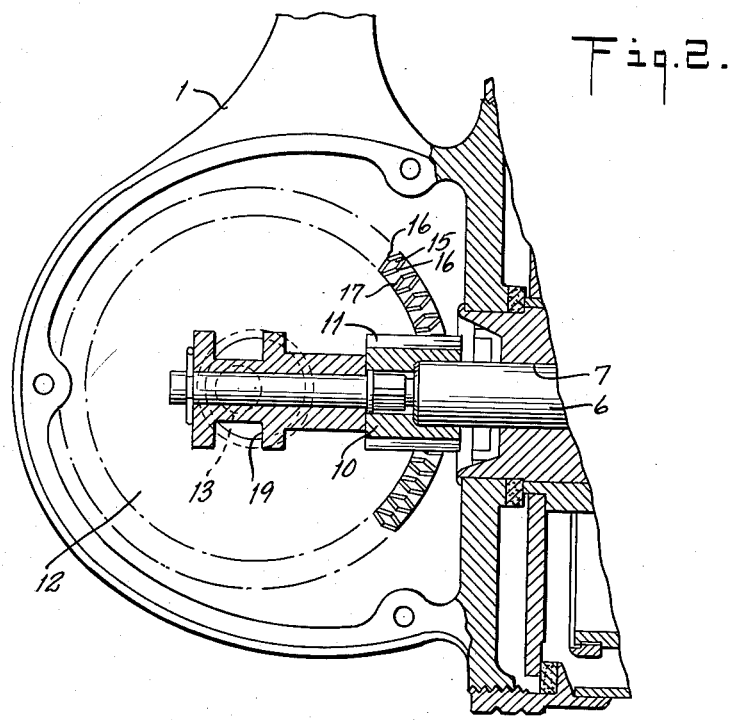
Fig. 2 is a partial sectional view of the reel shown in Fig. 1 but with the operating parts in a different position.

The reel shown in Figs. 1 and 2 is a typical spinning or fixed spool reel having a frame 1 and a fixed spool 2 and a spooling member 3, which in this case consists of a cylindrical shell 4 which is mounted coaxially with the fixed spool and is adapted to fit over the spool as shown in Fig. 1. A line pickup member 5 is provided which is actuated in a manner which forms no part of this invention to either project as shown in Fig. 1 for spooling the line or to be retracted during the casting operation.

The spooling member 3 is fixed on a shaft 6 which is mounted for rotation and reciprocation in a bearing 7. By the rotation of the shaft 6, the spooling member 3 is rotated for spooling the line on the spool 2 and reciprocation of the shaft 6 reciprocates the spooling member for level winding. In the form of reel shown, a hood 8 is provided fitting over the spool and spooling mechanism and is provided with an opening 9 for the line.

Fixed on the shaft 6 with its teeth projecting radially is a pinion or spur gear 10. The teeth 11 are elongated as shown in Fig. 1 so as to remain in mesh with the teeth of the crown gear 12 during reciprocation of the shaft.

The crown gear 12 which serves to rotate the pinion 10, the shaft 6 and the spooling member 3, is mounted on a driving shaft 13 which extends at right angles to the shaft 6. A crank 14 is fixed to the shaft 13 for manually rotating the same.

The crown gear 12 has a plurality of peripherally disposed teeth 15. These teeth are generally diamond shaped in plan when viewed from the face of the gear and project from the face of the crown gear and taper slightly as is shown in the drawings. One diagonal of the diamond of each tooth extends substantially radially of the gear and the other diagonal extends generally circumferentially of the gear. The apices 16 which may be referred to as lateral apices, being those disposed at the ends of the diagonals which extend generally circumferentially of the gear, all lie in a common circle concentric with the axis of the gear 12 and form line contact tooth faces 17 which engage the teeth 11 of the spur gear.

By providing the diamond shape, clearance is provided at both ends of the circle on which the line contact tooth faces fall so that the only contact between the teeth 15 of the crown gear and the teeth 11 of the spur gear is at the line contact face 17 and there is no interference as the crown gear rotates to drive the pinion.

The shaft 6 is reciprocated by means of a crank 18 carried by the shaft 13, which engages in a circumferential groove 19 in the member 20 carried by the shaft 6. As the shaft 13 rotates the crank member 18 which is eccentric to the axis of the shaft 13, it moves the shaft from the position shown in Fig. 1 to the position shown in Fig. 2 and on further rotation, back again to the position shown in Fig. 1, thus providing the reciprocation of the spooling member necessary for level winding. During this reciprocation, the teeth 15 of the crown gear and the teeth 11 of the spur gear remain in mesh, although the spur gear is reciprocated back and forth in the operation.

Figure 3:
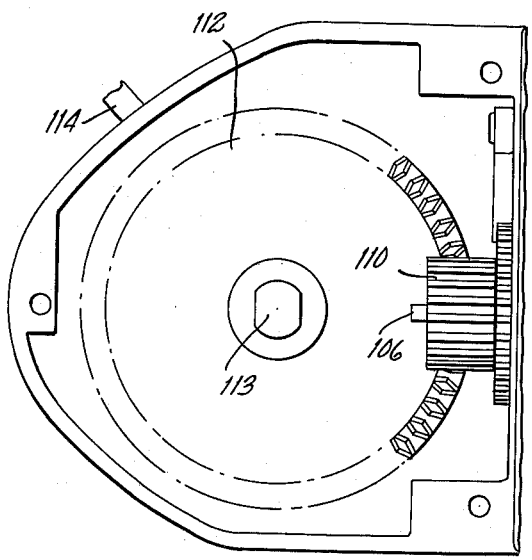
Fig. 3 is a partial sectional view of another reel utilizing gearing made in accordance with my invention.

The reel shown in Fig. 3 does not have the level wind feature. The pinion 110 is connected to a shaft, the end of which appears at 106 which carries a suitable spooling member similar to the member 3 shown in Fig. 1. The crown gear 112 is identical with the gear 12 shown in Figs. 1 and 2 and when rotated by the shaft 113 which is rotated by the handle 114, rotates the spooling member.

The gear shown and described is particularly desirable and useful because in assembling the reel it is not necessary to place the gear centers with the exactitude and close tolerance normally required in positioning bevel gears which would normally be employed in a drive such as this. Furthermore, the crown gear is one which can be manufactured easily and inexpensively on a milling machine and may be thus produced at a materially lower cost than would be the case with bevel gears, and the fact that it may be used with a pinion instead of a bevel mating gear is of material advantage in so far as cost is concerned. Furthermore, the construction is materially simplified because of the ability to slide the pinion in the crown gear.

In Figs. 6 and 7 there is shown how the crown gear can be made using a generating type gear hobbing machine. The gear blank indicated at 212 has a peripheral edge 221 from which the teeth are cut by a hobbing tool 222. The total is provided with a plurality of cutters 223, each of which has a plurality of teeth 224.

In cutting the gear the first pass of the cutting tool cuts a groove 225, which extends parallel to but is spaced to one side of the radius of the blank. This cut in general forms one side 226 of the diamond of a tooth, while at the same time forming the side 227 of the diamond of an adjacent tooth. One of the teeth 224 passing exactly radially of the gear blank forms the exact interdental space between the line contact faces 17 and one of the cutters which passes on a line parallel to but on the other side of the radius cuts the side 228 of one tooth and simultaneously the side 229 of the diamond of an adjacent tooth.

In actual operation the hobbing tool 222 is rotated on an axis generally parallel to the tangent to the gear blank and as it is rotated the gear blank is rotated in a counterclockwise direction as shown in Fig. 7.

The cutter members 223 each having a plurality of teeth 224 which are progressively disposed along the axis of the hobbing tool so that as the gear blank is rotated each tooth engages substantially in the slot 225 already formed in the gear blank, thus as the gear blank is rotated there is a slow transition from the slot indicated at 225 in Fig. 7 to the final gear formed with the teeth having the diamond plan and with the sides diverging from the line contact 17.

It will be appreciated by those skilled in the art that the positioning of the teeth on the hobbing tool and the rate of the rotation of the tool and the rate of turning of the gear blank are matters for careful timing, which, however, once the concept of forming the gear teeth in this manner is decided upon can be readily determined.

I claim:

1. The method of producing a crown gear having peripheral teeth of generally diamond shape as viewed in plan with the lateral vertices of said teeth lying in a common circle concentric with the axis of said gear comprising cutting a groove in a gear blank having a raised circular rib projecting from the face thereof and concentric with the axis of said blank, said cut going through said raised rib and being parallel to the radius thereof but spaced to one side thereof, thus forming one side of the diamond on one tooth, said side lying inside said circle and another side of a diamond on an adjacent tooth, said side lying outside said circle, forming the interdental space by cutting an identical groove radially through said rib and completing said gear by cutting an identical groove in said blank through said rib on the opposite side of said radius parallel and spaced therefrom and thus forming two additional sides of the diamond form of adjacent teeth one side lying inside and the other outside said circle.

2. The method of producing a crown gear having peripheral teeth of generally diamond shape as viewed in plan with the lateral vertices of said teeth lying in a common circle concentric with the axis of said gear, comprising forming one side of the diamond of a tooth, said side lying inside said circle and one side of the diamond of the next adjacent tooth, said side lying outside said circle by cutting a groove parallel to but spaced from the radius of said gear and forming one side of a diamond of a tooth, said side lying inside said circle and another side of a diamond, said side lying outside said circle on an adjacent tooth by cutting a groove parallel to but on the opposite side of the aforesaid radius.

3. The method according to claim 1 in which the cuts are made while rotating the gear on its axis progressively and continuously from the first mentioned cut to the last mentioned cut.

4. The method according to claim 2 in which the cuts are made while rotating the gear on its axis progressively and continuously from the first mentioned cut to the last mentioned cut.

5. The method according to claim 1 in which the cuts are made progressively and continuously from the first mentioned cut to the last mentioned cut.

6. The method according to claim 2 in which the cuts are made progressively and continuously from the first mentioned cut to the last mentioned cut.

References Cited in the file of this patent

UNITED STATES PATENTS

| 1,614,558 | Kasley | Jan. 18, 1927 |
| 2,750,850 | Wildhaber | June 19, 1956 |
| 2,778,240 | Prester | Jan. 22, 1957 |